United States Patent [19]

McKnight et al.

[11] 4,315,258
[45] Feb. 9, 1982

[54] TRANSMISSIVE AND REFLECTIVE LIQUID CRYSTAL DISPLAY

[75] Inventors: William H. McKnight, San Diego; Larry B. Stotts, Chula Vista; Michael A. Monahan, Poway, all of Calif.

[73] Assignee: The United States of America as represented by the Secretary of the Navy, Washington, D.C.

[21] Appl. No.: 121,948

[22] Filed: Feb. 15, 1980

[51] Int. Cl.³ .............................................. G09G 3/36
[52] U.S. Cl. ................................. 340/784; 340/765; 350/337; 350/338
[58] Field of Search ................ 340/784, 765; 350/337, 350/338, 334, 330, 331

[56] References Cited

U.S. PATENT DOCUMENTS 4,196,973  4/1980  Hochstrate .......................... 350/338

Primary Examiner—Marshall M. Curtis

Attorney, Agent, or Firm—Richard S. Sciascia; Ervin F. Johnston; Thomas Glenn Keough

[57] ABSTRACT

A visual display has an increased readout capability due to its operation in the transflective mode. A source of ambient light and light for radiation through the display from the backside together assure the increased readout capability. Heretofore, ambient light would degrade or washout a display making it nearly impossible for monitoring personnel to decipher alphanumeric or pictoral displays due to the decreased contrast. A pair of linear polarizers sandwich a twisted nematic liquid crystal and have their polarization axes either parallel or mutually orthogonally disposed so that the crystal will present bright or dark areas in response to applied potentials. Because a partially transmitting mirror is interposed between the sandwiched liquid crystal and the radiating light source, the ambient light augments the radiated light to enhance the visual display.

2 Claims, 3 Drawing Figures

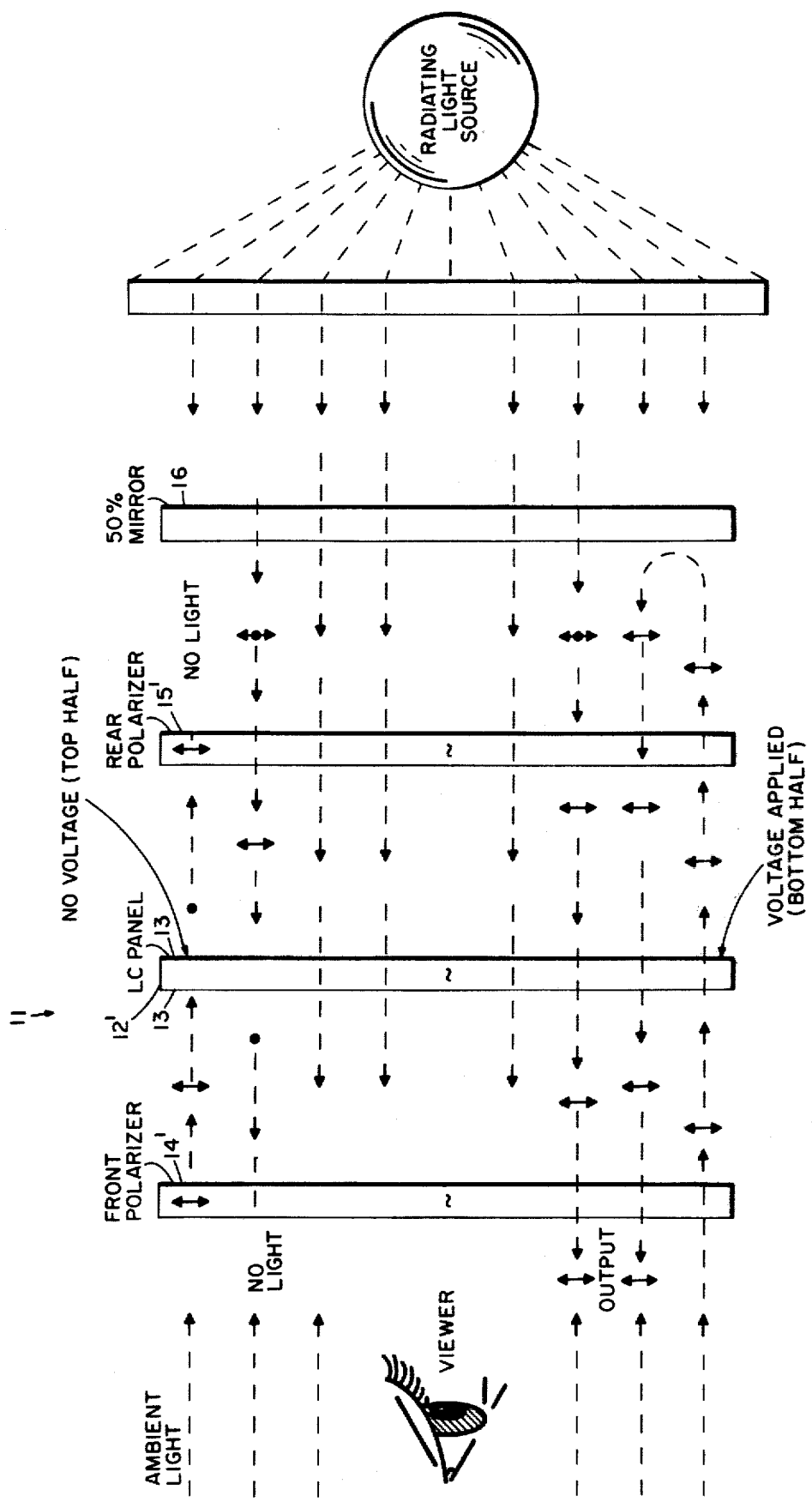

TRANSMISSIVE AND REFLECTIVE LIQUID CRYSTAL DISPLAY

BACKGROUND OF THE INVENTION

Visual displays of alphanumeric and graphic information are used on a scale hitherto unknown. The huge amounts of data now being processed on a real-time basis make conventional teletype and video readouts obsolete. Numerous large screen displays enabling simultaneous viewing by a number of users are being developed. Great numbers of light emitting diodes have been used with some degree of success; however, these displays and others usually are unduly complicated, consume great power and are vulnerable to the deleterious effects of the phenomenon known as washout. Washout occurs when an ambient light source is of such an intensity as to make it difficult to discern between activated areas (light areas) and inactivated areas (dark areas) on a display, thus dimishing the contrast. The information content thus is said to be washed out. All who have watched a disappearing picture on a conventional television screen as sunlight shines on it, have been washout.

The vast amounts of data that must be digested and acted upon by scientists and planners, particularly, in situ circumstances, require reliable, relatively uncomplicated visual displays within practical size and weight constraints. One candidate display is disclosed in the pending United States Patent and Trademark Office patent application No. 62,698 and is entitled "Liquid Crystal Fiber Optics Large Screen Display Panel" by Parvis Soltan et al. A liquid crystal panel responsively varies its opacity and images are transmitted to a screen via tapered optical fibers extending from one side of the panel. Alternately, light in front of the screen is reflected from a reflector surface behind the liquid crystal panel, through the fiber optics and back onto the display screen. In this manner, preprogrammed signals fed to the liquid crystal panel determine the information content of the displayed information for a number of viewers. In the close confines of a submersible or an instrument ladened aircraft several scientists and technicians can act on simultaneously presented data and coordinate their work. However, for all its good points, the meritorious capability of this display panel may be compromised by washout. The display operates in either the reflective mode or the transmissive mode and does not totally eliminate washout.

Washout has and continues to be a serious problem in aircraft cockpits. Data representative of navigational inputs, weapons delivery information, aircraft avoidance procedures etc., can be denied due to an operator's inability to discern meaningful information from a display because sunlight or other cockpit light indicators may blot out other meaningful data.

Another electrooptical mechanism for implementing a visual display is disclosed in U.S. Pat. No. 3,840,695 by Albert G. Fisher. The patented invention is entitled "Liquid Crystal Image Display Panel with Integrated Addressing Circuitry" and addresses itself to a matrix of twisted nematic liquid crystals actuated by thin film transistors to provide a flat panel visual readout. A multicolor display is illuminated from the rear by a white light to give a color television display without requiring the bulk of conventional cathode-ray tube arrangements. The relatively thin liquid crystal light valves and their associated polarizers transmit light emanating from the rear of the panel to a number of viewers. However, this unmodified approach operates in the transmissive mode and appears to be vulnerable to the deleterious effects of washout.

Thus, there is a continuing need in the state-of-the-art for a compact, reliable display panel capable of being operated in the transflective mode to avoid the problems otherwise associated with ambient light washout.

SUMMARY OF THE INVENTION

The present invention is directed to providing an apparatus having the capability for providing a visual display in the transflective mode. A source of ambient light and a source radiating light optically cooperate to enhance the visual display. A twisted nematic liquid crystal panel is disposed between the ambient light source and the radiating light source and is provided with a number of selected areas which vary their transmissivity in response to applied potentials. A first linear polarizer is located between the ambient light source and the liquid crystal for polarizing the ambient light and a second linear polarizer is located between the light radiating source and the liquid crystal also for polarizing the radiated light. A partially transmitting mirror is interposed between the second linear polarizer and the light radiating source for partially transmitting portions of the radiated light and for reflecting portions of the ambient light to enhance the visual display and to reduce washout.

It is a prime object of the invention to provide an improved visual display.

Yet another object is to provide a visual display employing a modulated twisted nematic liquid crystal panel.

Still another object is to provide a display having a pair of linear polarizers optionally mutually orthogonally disposed or arranged in a parallel relationship to assure responsive readouts.

Yet another object of the invention is to provide a display panel adapted for operation in the transflective mode.

Another object is to provide a display panel relatively uneffected by the washout phenomenon.

Still another object is to provide a compact panel relatively uneffected by a washout making it ideally suitable in the close confines of a cockpit.

Still another object is to provide a transflective panel inherently possessing a high degree of reliability.

Yet another object is to provide a panel employing a partially transmissive mirror for reducing the problems associated with washout.

These and other objects of the invention will become more readily apparent from the ensuing specification and claims when taken with the drawings.

BRIEF DESCRIPTION OF THE DRAWINGS

FIG. 3 is a schematic representation of another embodiment of the inventive concept of this invention.

DESCRIPTION OF THE PREFERRED EMBODIMENTS

Figure 1:
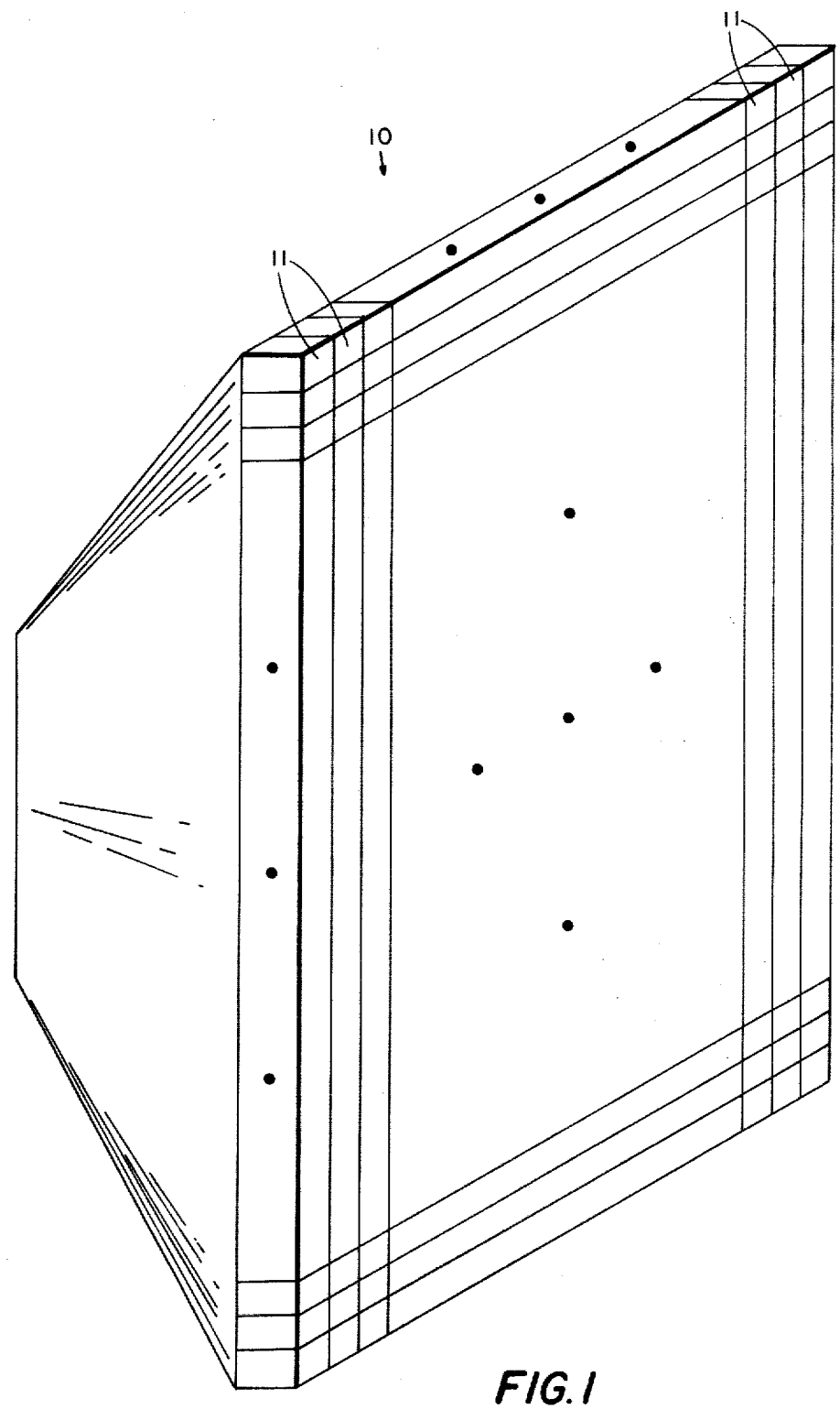
FIG. 1 depicts a representative characterization of an operative embodiment of the invention.

Referring now to FIG. 1 of the drawings a display 10 takes form in accordance with the teachings of the present invention and provides one or more viewers with a real-time indication of conditions of interest from a number of data inputs. The information is displayed in alphanumeric characters or any one of a variety of visual display schemes that can apprise a group rapidly.

The visual display is fabricated from a number of display elements 11 arranged in a matrix form. The display elements are of the type described in U.S. Pat. No. 3,840,695 and referred to above. While each of the element's composition and mode of operation are thoroughly described and explained in the U.S. Pat. No. 3,840,695 modifications consistent with the ever advancing state-of-the-art are to be routinely incorporated without departing from this novel inventive concept. At this point, however, let it suffice to say that the elements are actuated by an electric field across each element to effect a ninety degree rotation of the polarization plane of light through the crystal. A thin film transistor switching matrix appropriately actuates selective ones of the display so that the alphanumeric characters, designs, or any other desirable visual display are presented for all to see.

Each display element includes a liquid crystal panel 12 contained between a pair of appropriately etched plates 13. Linear polarizers 14 and 15 sandwich the liquid crystal panel between them and, in the embodiment of FIG. 1, the polarization axis of the polarizers are orthogonally disposed with respect to each other. In the embodiment of FIG. 3, linear polarizers 14' and 15' have their polarized axes parallel to one another so as to exhibit a different operational characteristic with respect to the embodiment of FIG. 2. The discrete modes of operation attributed to differently orienting the polarizers will be elaborated on below.

The polarizer-liquid crystal panel-polarizer laminate referred to above is substantially identical to that disclosed in the above referenced U.S. Pat. No. 3,840,695. The material of the liquid crystal can be that disclosed in the referenced patent or can be any one of several similar types of material exhibiting like characteristics and to this extent, the subject matter of this inventive concept does not differ substantially from that disclosed in the cited patent.

It is to be noted that the inventive concept described herein is directed toward an unobvious improvement over the state-of-the-art as represented by the cited patent. In other words, the improvement resides in unobvious modifications that give a display panel fabricated in accordance with the teachings of the present invention the capability for operating in the transflective mode to thereby assure greater reliability. The transflective mode of operation is characterized by the panel's having the capability for transmitting (transflective) light from an illuminating source and reflecting (transflective) ambient light for image enhancement and contrast. A viewer to the left of the embodiments depicted in FIGS. 2 and 3 benefits both from ambient light coming from the left as well as light coming from a radiating source projecting through the laminate to enhance the image and contrast observed by a single viewer or a goodly number of interested observers.

A partially transmissive mirror 16 is interposed between the polarizer-liquid crystal panel-polarizer laminate and the radiating light source. A partially transmitting mirror such as the one included in the present inventive concept has the properties of reflecting a considerable portion of light which impinges on one side as well as transmitting a substantial portion of light which impinges on the other side. These partially reflecting, or two-way mirrors as they are sometimes called, are more popularly known for applications where the knowledge of an observer's presence is to be denied.

Figure 2:
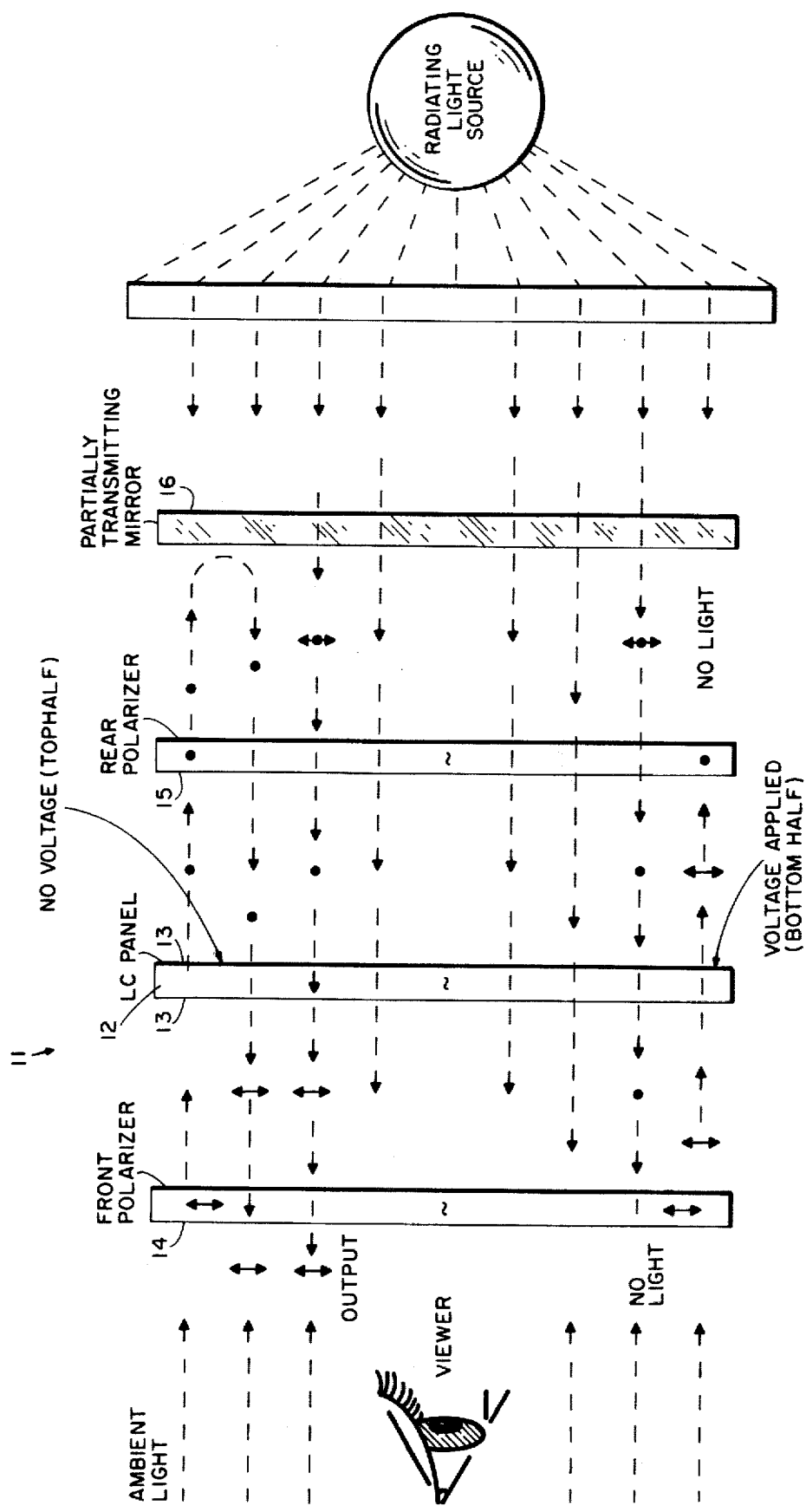
FIG. 2 depicts in schematic form one embodiment of the inventive concept.

Looking to the embodiment of FIG. 2, a viewer will be able to see an image contrast attributed to the reflected ambient light (operation in a reflective mode) and an image contrast from transmitted light from the radiating light source (transmissive mode) simultaneously. This simultaneous dual phenomenon is referred to as the transflective mode of image display and enhancement. To repeat, operation in a reflective mode calls for ambient uncollimated light from the observer's side of the panel to pass through the front polarizer and through the liquid crystal panel which is not energized (not in an electric field). When light passes through the unenergized panel cells (the top half of the liquid crystal panel 12 in FIG. 1) its optical axis is rotated ninety degrees by the twisted nature of the molecules in the liquid crystal panel. Linear polarizer 15 helps provide contrast by transmitting the rotated light passed by the energizing liquid crystal panel. The partially transmitting mirror 16 reflects the rotated light back through polarizer 15, through liquid crystal panel 12 which rerotates it back through polarizer 14 and towards a viewer. Simultaneously, collimated light emanating from the radiating light source passes through the partially transmitting mirror 16 through rear polarizer 15. Next, the light is twisted ninety degrees by liquid crystal panel 12 to facilitate its passage through front polarizer 14 toward the assembly of viewers. Thus, there is an image enhancement by transflection of a displayed character through an unenergized liquid crystal panel to enhance an image to an assembly of observers.

Conversely, in the lower half of the liquid crystal panel 12 depicted in FIG. 2, there is a potential applied across the panel so that there is no ninety degree twisting of the polarization axis of transmitted light as it passes through the panel. Ambient light coming through front polarizer 14 is not rotated by liquid crystal panel 12 so that no light passes through the orthogonally disposed rear polarizer 15. A darkened portion of the panel remains dark even though ambient light falls on an energized panel. That is, there is also image or contrast enhancement due to the ambient light so that the portion of the liquid crystal panel where a potential is applied appears to be darker. In a like manner, a portion of the light emanating from the radiating light source passes through partially transmitting mirror 16 and is polarized by rear polarizer 15. Since there is a voltage applied across the lower half of liquid crystal panel 12, there is no axis rotation of the (linearly) polarized light so that front polarizer 14 blocks a transmission of any light from the radiating light source. The dark portion of the display represented by an energized liquid crystal panel remains dark.

Opposite results are obtained from the embodiment of FIG. 3 in which linear polarizers 14' and 15' are oriented so that their polarization axes are parallel with respect to one another. Looking to the upper half of the liquid crystal panel 12', there is no potential applied across this top half. Thus, ambient light coming from the left passes through front polarizer 14' and its polarization axis is rotated ninety degrees during its passage through the liquid crystal panel. Rear polarizer 15' effectively blocks the transmission of the rotated light so that there is no light to impinge upon the partially transmitting mirror 16. Simultaneously, a portion of the collimated light from the radiating light source passes through the partially transmissive mirror 16. It is polarized after passing through linear polarizer 15' and its axis rotated ninety degrees during its passage through liquid crystal 12'. The front polarizer 14' prevents the light from the radiating light source from reaching viewers to the left of the display panel.

On the other hand, when a potential is applied across the bottom half of liquid crystal panel 12' in FIG. 3, ambient light from the viewer's side is polarized by linear polarizer 14', uneffected during its passage through the liquid crystal panel, passed through mirror polarizer 15' and reflected by the partially transmitting mirror 16 back through linear polarizer 15', liquid crystal 12' and linear polarizer 14' to the viewers. A portion of the emanated light from the radiating light source is transmitted through the partially transmitting mirror 16 through the linear polarizer 15', the liquid crystal 12' and front polarizer 14' to the viewers.

The inventive concept draws on up the transflectivity phenomenon to assure image (or contrast) enhancement of the display and is reliable and manageable due to its uncomplicated composition and simplicity. Size and bulk are kept to a minimum.

Obviously, many other modifications and variations of the present invention are possible in the light of the above teachings. It is therefore to be understood that within the scope of the appended claims the invention may be practiced otherwise than as specifically described.

What is claimed is:

1. An apparatus having the capability for providing a visual display in the transflective mode comprising:

means for providing a source of ambient light;

means for radiating light through a predetermined volume;

a nematic liquid crystal interposed between the ambient light providing means and the light radiating means in the predetermined volume for selectively rotating the polarization axis of transmitted and reflected light therethrough in select areas thereof in response to applied potentials to create relatively bright areas to a viewer located in the ambient light area when an applied potential is impressed thereacross;

first means disposed between the ambient light providing means and the nematic liquid crystal for polarizing the ambient light into a single linearly polarized component;

second means disposed between the light radiating means and the nematic liquid crystal for polarizing the radiated light into a single component, the first polarizing means and the second polarizing means being a pair of linear polarizers disposed in a parallel orientation; and a "one way" mirror, partially transmissive and interposed between the second polarizing means and the light radiating means for partially transmitting portions of the radiated light and specularly reflecting portions of the ambient light, the twisted nematic liquid crystal creating relatively bright areas to a viewer located in the ambient light area when an applied potential is impressed thereacross whereby the contrast of the visual display is enhanced and washout is reduced.

2. An apparatus having the capability for providing a visual display in the transflective mode comprising:

means for providing a source of ambient light;

means for radiating light through a predetermined volume;

a nematic liquid crystal interposed between the ambient light providing means and the light radiating means in the predetermined volume for selectively rotating the polarization axis of transmitted and reflected light therethrough in select areas thereof in response to applied potentials to create relatively bright areas to a viewer located in the ambient light area when an applied potential is impressed thereacross;

first means disposed between the ambient light providing means and the nematic liquid crystal for polarizing the radiated light into a single component;

second means disposed between the light radiating means and the nematic liquid crystal for polarizing the radiated light into a single component, the first polarizing means and the second polarizing means being a pair of linear polarizers disposed in a mutually orthogonal orientation; and a "one way" mirror, partially transmissive and interposed between the second polarizing means and the light radiating means for partially transmitting portions of the radiated light and specularly reflecting portions of the ambient light, the twisted nematic liquid crystal creates relatively dark areas to a viewer located in the ambient light area when an applied potential is impressed thereacross whereby the contrast of the visual display is enhanced and washout is reduced.

* * * * *